United States Patent
Van Phan et al.

(10) Patent No.: US 9,198,162 B2
(45) Date of Patent: Nov. 24, 2015

(54) RESOURCE ALLOCATION FOR DIRECT TERMINAL-TO-TERMINAL COMMUNICATION IN A CELLULAR SYSTEM

(75) Inventors: Vinh Van Phan, Oulu (FI); Ling Yu, Oulu (FI); Kari Veikko Horneman, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 40 days.

(21) Appl. No.: 13/636,378

(22) PCT Filed: Mar. 23, 2010

(86) PCT No.: PCT/EP2010/053763
§ 371 (c)(1),
(2), (4) Date: Oct. 22, 2012

(87) PCT Pub. No.: WO2011/116815
PCT Pub. Date: Sep. 29, 2011

(65) Prior Publication Data
US 2013/0059583 A1 Mar. 7, 2013

(51) Int. Cl.
*H04W 60/00* (2009.01)
*H04W 72/04* (2009.01)
*H04W 92/18* (2009.01)

(52) U.S. Cl.
CPC ............ *H04W 72/04* (2013.01); *H04W 72/048* (2013.01); *H04W 92/18* (2013.01)

(58) Field of Classification Search
CPC .................................................... H04W 60/00

USPC ................................. 455/435.1; 370/330, 254
See application file for complete search history.

(56) References Cited

U.S. PATENT DOCUMENTS

| | | | |
|---|---|---|---|
| 2006/0168343 A1* | 7/2006 | Ma et al. ........................ | 709/245 |
| 2007/0195731 A1 | 8/2007 | Camp, Jr. ...................... | 370/329 |
| 2007/0230423 A1 | 10/2007 | Yoshida et al. ............... | 370/338 |
| 2009/0046653 A1* | 2/2009 | Singh et al. ................... | 370/330 |
| 2009/0074094 A1* | 3/2009 | Palanki et al. ................ | 375/260 |
| 2010/0011110 A1 | 1/2010 | Doppler et al. ............... | 709/228 |
| 2010/0165882 A1* | 7/2010 | Palanki et al. ................ | 370/254 |
| 2010/0202391 A1* | 8/2010 | Palanki et al. ................ | 370/329 |
| 2011/0082940 A1* | 4/2011 | Montemurro et al. ........ | 709/227 |
| 2011/0228666 A1* | 9/2011 | Barbieri et al. ............... | 370/216 |

FOREIGN PATENT DOCUMENTS

GB 2 336 070 A 10/1999

* cited by examiner

*Primary Examiner* — Jinsong Hu
*Assistant Examiner* — Jean Chang
(74) *Attorney, Agent, or Firm* — Harrington & Smith

(57) ABSTRACT

Resource allocation for direct terminal-to-terminal communication in a cellular system. There are provided measures for resource allocation for direct terminal-to-terminal communication in a cellular system, said measures exemplarily including configuration of common resources for supporting direct communication between terminals across a predefined registration area including one or more cells of a cellular system, and control of an allocation of common resources for enabling direct communication between terminals across the predefined registration area. Said measures may exemplarily be applied for establishing terminal-to-terminal communication in LTE or LTE-Advanced cellular networks.

28 Claims, 4 Drawing Sheets

RESOURCE ALLOCATION FOR DIRECT TERMINAL-TO-TERMINAL COMMUNICATION IN A CELLULAR SYSTEM

FIELD OF THE INVENTION

The present invention relates to resource allocation for direct terminal-to-terminal communication in a cellular system.

BACKGROUND OF THE INVENTION

In the development of radio communication systems, in particular cellular communication (like for example GSM (Global System for Mobile Communication), GPRS (General Packet Radio Service), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved or advanced radio access networks (like for example the Evolved Universal Terrestrial Radio Access Network (E-UTRAN)) or as being part of a long-term evolution (LTE) or LTE-Advanced, also generally referred to as International Mobile Communications—Advanced (IMT-A). Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture.

In the following, for the sake of intelligibility, LTE (Long-Term Evolution according to 3GPP terminology) or LTE-Advanced is taken as a non-limiting example for a broadband radio access network of cellular type being applicable in the context of the present invention and its embodiments. However, it is to be noted that any kind of radio access network of cellular type may likewise be applicable, as long as it exhibits comparable features and characteristics as described hereinafter.

In the development of cellular systems in general, and access networks in particular, a direct communication of mobile cellular devices without involvement of the fixed network part has been proposed as one concept. This concept may be equally referred to as device-to-device (D2D) communications, mobile-to-mobile (M2M) communications, machine-to-machine (M2M) communications, terminal-to-terminal (T2T) communications, peer-to-peer (P2P) communications, or the like. In the following, for the sake of intelligibility, the term device-to-device (D2D) communications is used for this concept, while the term "device" is to be understood as being synonymous with the terms "terminal", "peer", "mobile", or the like.

The motivation and purpose of incorporating direct D2D communications into a cellular network is, among various aspects, to reduce transmitter power consumption in both the device and the network, to improve the spectrum efficiency and network resource utilization, to increase cellular network capacity and coverage, to create and support more services for the users in most efficient fashion, and so on.

In general, mobile cellular D2D communication, D2D for short, is assumed to use licensed radio spectrum under supervision and control of supporting cellular systems. D2D communications may or may not use radio resources of the hosting (i.e. supporting) and/or local cellular system or systems, wherein the former is referred to as in-band D2D in which D2D connections share the radio resources of the cellular system with conventional radio links via base stations such as eNBs, and the latter is referred to as outband D2D in which D2D connections have available specifically dedicated resources independent of those of the cellular system.

Not only, but particularly in an in-band D2D system where the same radio resources of the supporting cellular system are also used for direct D2D communications, the D2D resource allocation should preferably be under the control of the cellular system e.g. to avoid severe interference between cellular and D2D users. However, the regular resource allocation, monitoring and control mechanisms in cellular networks are not designed for localized and distributed D2D communications in which user data transmission as well as control signaling—at least in part—happen directly between two or multiple mobile devices such as UEs.

Furthermore, as mobile devices are not a trusted entity for an operator's network, a threat of unauthorized usage of radio resources could be created or aggravated when allowing (more) UE-centric distributed control, i.e. mobile devices making (more) decision in conducting direct D2D communications. Therefore, the cellular system shall preferably retain supervision and control of D2D communications both in control signaling as well as in actual user data transfer.

For example, certain control and assistance for D2D resource allocation is necessary and important from network operator's point of view. This raises a problem in how to allow the network to manage and identify distributed D2D users in fast and efficient way upon D2D registration, namely during D2D resource and/or connection establishment.

There exists a need and problem of initial resource allocation for supporting direct D2D communications in cellular networks, i.e. resource allocation for prior to actual D2D communications.

In this regard, mobile devices need to discover each other first in order to establish a proper radio connection for D2D communications, especially considering the possibility of semi-autonomous D2D setup. To facilitate this need, it has been proposed to have the mobile devices transmit some individual reference signals or sequences or to broadcast some predefined beacons, which are unique among a local networking neighborhood of the mobile devices (such as the cell area of the serving base station), in certain predefined channels.

Given a huge number of mobile devices or network nodes in recent or future mobile cellular systems employing D2D communications, an important problem is how to define and allocate limited cellular resources for reliable and effective transmission of such reference signals, sequences and/or beacons on physical channels in the context of D2D connection establishment. In the following, such resource allocation is referred to as initial resource allocation for supporting direct D2D communications.

According to a conceivable approach for such problem, it may be assumed that there are a certain number of designated beacon channels for D2D communications per cell and D2D mobile devices camping in a respective cell may select one channel for D2D beaconing. However, as indicated below, such approach is disadvantageous in that it addressed initial resource allocation for D2D communications on a cell basis and is based on a UE-centric distributed control.

Accordingly, there is a demand for a feasible solution for facilitating efficient (initial) resource allocation for direct terminal-to-terminal communication in a cellular system.

SUMMARY OF EMBODIMENTS OF THE INVENTION

The present invention and its embodiments aim at solving the above problems.

The present invention and its embodiments are made to provide for a feasible solution for facilitating efficient (initial) resource allocation for direct terminal-to-terminal communication in a cellular system.

According to an exemplary first aspect of the present invention, there is provided a method, comprising configuring common resources for supporting direct communication between terminals across a predefined registration area comprising one or more cells of a cellular system, and controlling an allocation of common resources for enabling direct communication between terminals across the predefined registration area.

According to further developments or modifications thereof, one or more of the following applies:

- said configuring comprises negotiating the common resources with one or more base stations of cells comprised in the predefined registration area, and/or renegotiating the common resources upon reconfiguration of the predefined registration area by activation or deactivation of one or more base stations of cells comprised in the predefined registration area,
- said controlling comprises determining and assigning the allocation of common resources and the configuration thereof to a terminal being registered to the predefined registration area, and/or determining and assigning the allocation of common resources as a common direct access channel to a cell comprised in the predefined registration area or the predefined registration area,
- said controlling comprises coordinating the allocation of common resources for enabling spatial reuse of common resources within the predefined registration area and/or between the predefined registration area and one or more overlapping and/or neighboring registration areas,
- said controlling comprises updating and/or reconfiguring the allocation of common resources upon request by one or more terminals and/or system-based initiation,
- the allocation of common resource comprises one or more of one or more reference signals, reference sequences, and/or beacons, one or more physical channels for transmitting reference signals, reference sequences, and/or beacons, transmit power for transmitting reference signals, reference sequences, and/or beacons, and schedule for transmitting reference signals, reference sequences, and/or beacons,
- the allocation of common resource is based on one or more of terminal profile characteristics and/or status of one or more terminals, mobility contexts of one or more terminals and/or one or more cells, characteristics and/or load level of common resources, and availability of resources and/or interference status in the predefined registration area,
- the method is operable at or by a dedicated registration server function for managing the predefined registration area which is operable as or at one or more base stations of cells comprised in the predefined registration area or a network element controlling one or more base stations of cells comprised in the predefined registration area, and/or
- the cellular system is an evolved cellular network in accordance with LTE and/or LTE-Advanced specifications.

According to an exemplary second aspect of the present invention, there is provided an apparatus, comprising a processor configured to configure common resources for supporting direct communication between terminals across a predefined registration area comprising one or more cells of a cellular system, and control an allocation of common resources for enabling direct communication between terminals across the predefined registration area.

According to further developments or modifications thereof, one or more of the following applies:

- said processor is further configured to negotiate the common resources with one or more base stations of cells comprised in the predefined registration area, and/or renegotiate the common resources upon reconfiguration of the predefined registration area by activation or deactivation of one or more base stations of cells comprised in the predefined registration area,
- said processor is further configured to determine and assign the allocation of common resources and the configuration thereof to a terminal being registered to the predefined registration area, and/or determine and assign the allocation of common resources as a common direct access channel to a cell comprised in the predefined registration area or the predefined registration area,
- said processor is further configured to coordinate the allocation of common resources for enabling spatial reuse of common resources within the predefined registration area and/or between the predefined registration area and one or more overlapping and/or neighboring registration areas,
- said processor is further configured to update and/or reconfigure the allocation of common resources upon request by one or more terminals and/or system-based initiation,
- said processor is further configured to control the allocation of common resource comprising one or more of one or more reference signals, reference sequences, and/or beacons, one or more physical channels for transmitting reference signals, reference sequences, and/or beacons, transmit power for transmitting reference signals, reference sequences, and/or beacons, and schedule for transmitting reference signals, reference sequences, and/or beacons,
- said processor is further configured to control the allocation of common resource based on one or more of terminal profile characteristics and/or status of one or more terminals, mobility contexts of one or more terminals and/or one or more cells, characteristics and/or load level of common resources, and availability of resources and/or interference status in the predefined registration area,
- the apparatus is operable as or at a dedicated registration server function for managing the predefined registration area which is operable as or at one or more base stations of cells comprised in the predefined registration area or a network element controlling one or more base stations of cells comprised in the predefined registration area, and/or
- the cellular system is an evolved cellular network in accordance with LTE and/or LTE-Advanced specifications.

According to an exemplary third aspect of the present invention, there is provided a computer program product including a program comprising software code portions being arranged, when run on a processor of an apparatus (such as e.g. according to the above second aspect and/or developments or modifications thereof), to perform the method according to the above first aspect and/or developments or modifications thereof.

According to further developments or modifications thereof, the computer program product comprises a computer-readable medium on which the software code portions are stored, and/or the program is directly loadable into a memory of the processor.

By way of exemplary embodiments of the present invention, there are provided mechanisms and measures to enable a reliable and efficient network-configured and network-controlled initial resource allocation for supporting D2D communications in (advanced) cellular systems.

By way of exemplary embodiments of the present invention, it is enabled that mobile devices may be controlled for D2D communications on the part of the cellular network, regardless of the current cellular state of the mobile devices, i.e., whether the mobile devices are in IDLE or CONNECTED state.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

In particular, the present invention and its embodiments are mainly described in relation to 3GPP specifications being used as non-limiting examples for certain exemplary network configurations and deployments. In particular, an LTE/LTE-A (E-UTRAN) radio access network and corresponding standards (Release-8, Release-9, and Release-10 and beyond) are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, embodiments of the present invention may be applicable in/for any cellular system or network with a need for D2D communications. Embodiments of the present invention may be applicable for/in any kind of modern and future communication network including any conceivable mobile/wireless communication networks according to 3GPP (Third Generation Partnership Project) or IETF (Internet Engineering Task Force) specifications.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In the following, exemplary embodiments of the present invention are described with reference to methods, procedures and functions.

Figure 1:
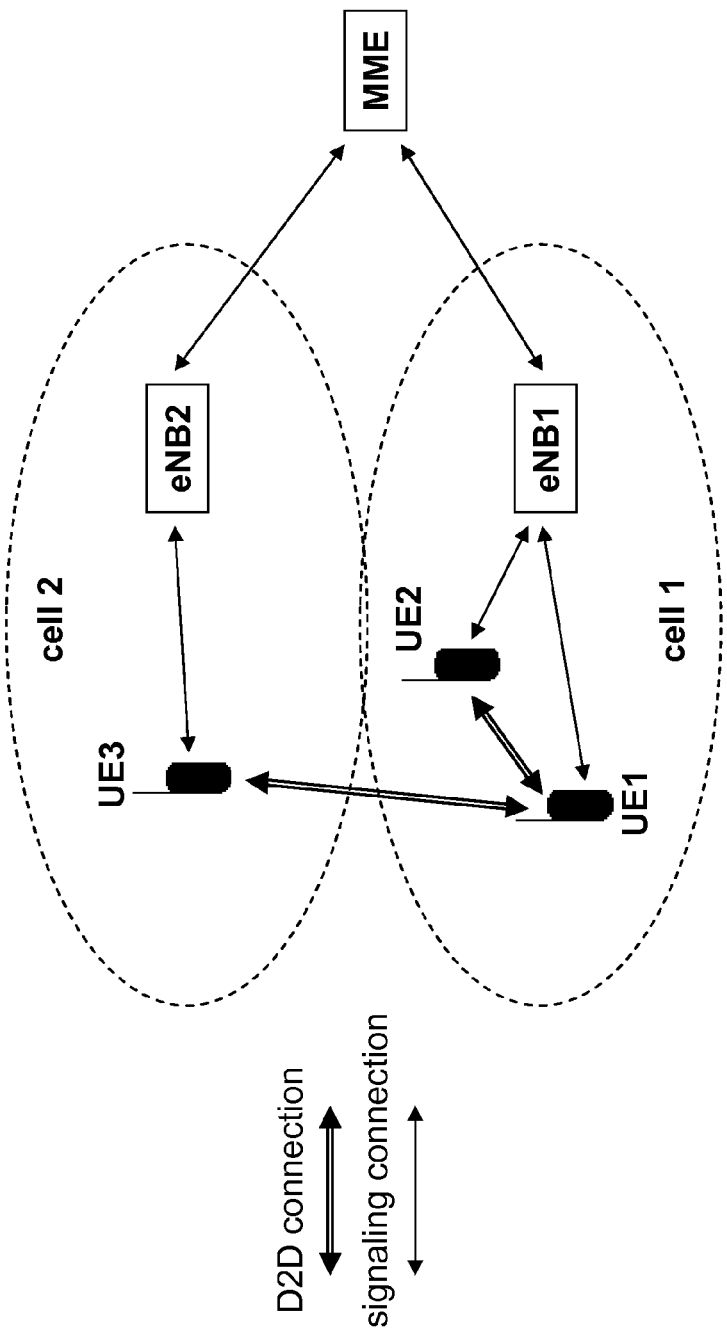
FIG. 1 shows a schematic diagram of a typical deployment scenario of a cellular system for which exemplary embodiments of the present invention are applicable.

FIG. 1 shows a schematic diagram of a typical deployment scenario of a cellular system for which exemplary embodiments of the present invention are applicable.

In the example of FIG. 1, two mobile devices or terminals UE1 and UE2 are located in a first cell being served by a first base station eNB1, and another mobile device or terminal UE3 is located in a second cell being served by a second base station eNB2. Both base stations eNB1 and eNB2 are served or controlled by a common network element of a core network part, which is exemplarily illustrated as a mobility management entity MME. D2D communications between the mobile devices or terminals UE1, UE2 and UE3 may be accomplished by means of the illustrated D2D connections, while these D2D connections may be established and controlled via signaling connections towards the fixed system parts of the radio access network part and the core network part.

In the example of FIG. 1, it is assumed that both cells constitute a common D2D registration area which is defined by the cellular system/network to assist D2D user registration and D2D service provisioning.

The concept of the D2D registration area is based on the concept of mobile location tracking area. Generally, the D2D registration area has a unique identity and consists of one or more cells covering certain geographical area supporting D2D communications and services. D2D devices need to register upon entering a D2D registration area. This concept allows the system to manage and identify D2D users in a fast and efficient fashion during a D2D registration and connection establishment, especially when supporting UE-initiated D2D connection or resource requests.

Although not illustrated in FIG. 1, a logical function being responsible for registration, authentication and identifying of D2D users and management of D2D-related UE identifications in the network side is linked with each D2D registration area. Such logical function is hereinafter referred to as D2D Registration Server Function (DRSF), and assists in D2D user registration and D2D service provisioning in the D2D registration area.

To register and authenticate D2D users, the DRSF keeps a mapping table of D2D user identifiers and corresponding temporary UE identifiers for every registered D2D user. To assist UE-initiated D2D connection setup (in which the originating UE of a D2D call should include D2D user identifier of the terminated user of the D2D call such as some memorable number, nickname or e-mail address), the DRSF derives the temporary UE identifier of the terminated D2D call user and uses the temporary UE identifier to page the user for setup of D2D connection.

According to various embodiments of the present invention, the D2D registration server function (DRSF), which may generally be regarded as a D2D network server, may be located in a radio access network (RAN) entity (e.g. eNB) or in a core network entity (e.g. MME) or in both with a hierarchical structure.

When the DRSF is located in the RAN, the DRSF may be implemented in a centralized or distributed way. For a centralized DRSF, the D2D registration area should be limited within the control area of one RAN element. For instance, if the DRSF is located in an eNB, the D2D registration area is limited to the cell/s controlled by one eNB. For a distributed DRSF, the D2D registration area can be extended into the coverage area controlled by multiple RAN elements to avoid too frequent D2D registration. In this case, D2D-related control signaling (e.g. D2D paging, D2D connection setup, etc.) needs to be traversed over the RAN elements interface (e.g. X2 interface in E-UTRAN).

When the DRSF is located in the core network, the D2D registration area can be aligned with e.g. tracking area of cellular network or even in the whole area that is under control of one core network entity (e.g. MME). Such an implementation may relief the burden for frequent D2D registration, but may prolong the D2D connection setup time and waste resources for paging D2D users in a larger area.

When the DRSF is implemented in a hierarchical structure, the part of DRSF that is located in the RAN may be used for managing the D2D users who are in cellular active state, and the part of the DRSF that is located in the core network part is responsible for managing the D2D users who are in cellular idle state or all the registered D2D users. With such hierarchical structure, the registration update of D2D users in cellular active state can be incorporated into normal handover procedure to reduce the signaling overhead introduced by frequent D2D registration, and also keep the advantage to have shorter D2D connection setup time. In such implementation, the D2D registration area also needs to be designed in the same hierarchical way.

Users, i.e. mobile devices, that would like to perform D2D communication, need to register to the network with D2D user identifiers and a temporary UE identifier (e.g. S-TMSI) that is allocated by the network.

According to embodiments of the present invention, the above-outlined concept of the D2D registration area is applied for resource allocation. That is, on the basis of the concept of the D2D registration area a reliable and effective network-configured and network-controlled initial resource allocation for D2D mobile devices in (advanced) cellular systems, such as 3GPP LTE-A, is enabled.

Figure 2:
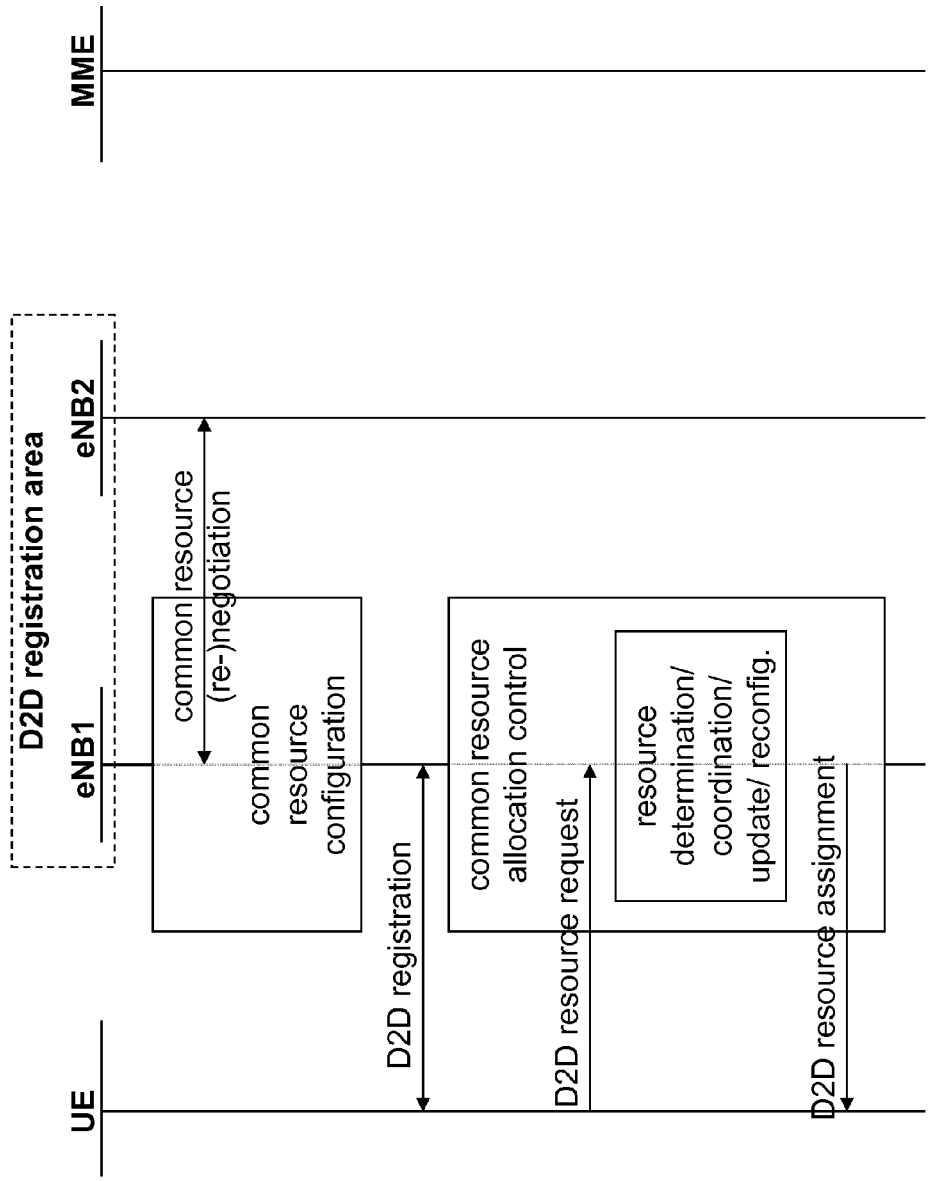
FIG. 2 shows a signaling diagram of a procedure according to exemplary embodiments of the present invention, which is based on the deployment scenario depicted in FIG. 1.

FIG. 2 shows a signaling diagram of a procedure according to exemplary embodiments of the present invention, which is based on the deployment scenario depicted in FIG. 1. In the example of FIG. 2, it is assumed that base stations eNB1 and eNB2 (or the cells thereof) constitute a D2D registration area, and that the DRSF serving this D2D registration area is implemented in a distributed manner in both base stations across the D2D registration area.

As shown in FIG. 2, a procedure according to exemplary embodiments of the present invention basically comprises two stages which may be executed independent of each other.

In a first stage, common resources for supporting direct communication between terminals across a predefined registration area are configured, e.g. by a correspondingly configured processor of the entity hosting (part of) the DRSF, in the present example eNB1. That is, a common resource pool is configured or formed for initial resource allocation of D2D capable UEs over a specific D2D registration area (from which pool necessary initial resources may then be determined and assigned to a D2D capable UE upon, e.g., its registration to the D2D registration area).

It is noted that, from the point of view of FSU (Flexible Spectrum Use) and SON (Self Organizing Network) aspects of the hosting (advanced) cellular system, the eNBs may be deployed as plug-and-play network elements and configured with different carriers or spectrum resources. The D2D reg-istration areas are formed by groups of eNBs and cells thereof and, therefore, reconfigured dynamically upon individual plug-and-play eNBs joining (being reactivated into) or leaving (being deactivated from) the system.

The eNBs and their cells, upon joining or forming the D2D registration area, may negotiate and agree upon the common resources and cell configuration for D2D support and initial resource allocation across the D2D registration area. Further, the eNBs and their cells, upon reconfiguration of the D2D registration area by activation or deactivation of one or more eNBs thereof and their cells, may (re-)negotiate and (re-) agree upon the common resources and cell configuration for D2D support and initial resource allocation across the D2D registration area. Such re-/negotiation may be accomplished e.g. by a correspondingly configured processor of the entity hosting (part of) the DRSF, in the present example eNB1.

In the case underlying the example of FIG. 2, i.e. the DRSF being distributed into the eNBs (that is, eNB1 and eNB2) across the D2D registration area, the above-mentioned negotiation may happen between the neighboring eNBs. The individual eNBs may be responsible for radio measurements on the common D2D resources in their respective cells and for reporting the measurement results among them to help making proper decision on the D2D resource allocation.

In a second stage, on the basis of the configuration of common resources, an allocation of common resources for enabling (or supporting) direct communication between terminals across the predefined registration area is controlled, e.g. by a correspondingly configured processor of the entity hosting (part of) the DRSF, in the present example eNB1. That is, initial resources to a D2D-capable UE (for transmitting reference signals, sequences or beacon channel) valid throughout the D2D registration area are determined and assigned, and/or the common resource pool may be utilized on an individual cell basis (e.g. based on local cell D2D load condition) or on a D2D registration area basis as a common contention-based direct access channel in uplink to serve mobile users.

Such initial resource allocation may then be used by the UE for advertising/beaconing and for detecting potential communication partners (i.e. other D2D-capable UEs within reach), as described in detail below. Such initial resource allocation may (typically upon advertising/beaconing and detection of potential communication partners) also be used for D2D connection/communication setup towards one or more detected D2D-capable UEs serving as communication partners. In general terms, such initial resource allocation may be used for D2D connection establishment including advertising/beaconing and communication partner detection and/or actual D2D connection/communication setup.

Namely, upon registration of a D2D device, in the present example UE (which may, in contrast to the exemplary illustration of FIG. 2, also be executed/completed already prior to or during the common resource configuration), to a D2D registration area, the network, e.g. the D2D Registration Server Function (DRSF) entity, may control allocation of common resources out of the configured common resource pool.

Upon the registration of a D2D device (in the present example UE, i.e. UE1 or UE2 according to FIG. 1) to a D2D registration area, the network, e.g. the D2D Registration Server Function (DRSF) entity which is (at least partly) located at eNB1 in the present example, may determine to assign and assign the UE with an initial resource allocation for D2D operation.

In this regard, it is noted that, while FIG. 2 exemplarily depicts a D2D resource request being sent from the UE to the eNB1, no such (explicit) request is needed. That is, the eNB1 in the present case may (automatically) determine to assign and assign the UE with an initial resource allocation for D2D operation (directly) upon its registration.

Further, the network, e.g. the D2D Registration Server Function (DRSF) entity which is (at least partly) located at eNB1 in the present example, may determine to assign and assign the D2D registration area or its cell with an initial resource allocation for D2D operation. That is, e.g. depending on a D2D load level on the common D2D resources (e.g. the number of registered D2D UEs and especially those configured as advertising UEs (see below) or the interference level on the common D2D resources), the individual local cells may be allowed and facilitated to utilize the common D2D resources to serve local users, i.e. UEs, with further advanced access purposes. For instance, an initial allocation of the common D2D resources may be utilized as a common contention-based direct access channel in uplink of the local cells across the D2D registration area. The registered D2D users or other authentic mobile users may then access the channel for sending data and control messages.

Still further, the network, e.g. the D2D Registration Server Function (DRSF) entity which is (at least partly) located at eNB1 in the present example, may coordinate an initial allocation of common D2D resources within its D2D registration area and/or between its D2D registration area and one or more overlapping and/or neighboring D2D registration areas. Thereby, spatial reuse of common D2D resources may be enabled.

An initial resource allocation as described above is valid throughout the D2D registration area until a next update or reconfiguration.

Such update or reconfiguration of D2D resource allocation may, for example, be due to the network upon a D2D registration update of mobile devices in the D2D registration area or the mobile device upon a respective request. It may, for example, also be triggered by any resource conflicts or (potential) collisions due to interference detected by the network (e.g. DRSF, eNB, or the like) based on eNB measurement reports from UEs, or the like. That is, such update or reconfiguration of D2D resource allocation may be driven by any conceivable allocation optimization criterion.

The registered UE may request or the network may initiate an update and/or reconfiguration of the D2D initial resource allocation and status of the registered UE whenever necessary. The latter may include some paging of the registered UE in the D2D registration area, if the registered UE is being in the IDLE state of the host cellular system. The update and/or reconfiguration may be made for an individual or a group of registered UEs.

To allow spatial reuse of beaconing resources/channels within one D2D registration area, initial resource allocation is coordinated in this D2D registration area. For example, one beaconing channel may be linked to multiple reference signals/sequences. The registered UE may be allocated a unique reference signal/sequence in the D2D registration area, but may share the same beaconing channel with other registered UEs.

To allow spatial reuse of beaconing resources/channels within a group of multiple D2D registration areas, initial resource allocation is coordinated across overlapping and/or neighboring D2D registration areas. For example, reference signals/sequences or beaconing resources/channels may be spatially reused or divided between overlapping or neighboring D2D registration areas. This may enable setting up possible D2D communication across more than one D2D registration area, i.e. a direct communication between UEs camping in cells belonging to different D2D registration areas. This case may require a corresponding interaction between the involved D2D registration areas (e.g. eNBs and DRSFs thereof).

The network decision as well as the determined/coordinated/updated/reconfigured configurations and constraints of the initial resource allocation may be based on UE profile characteristics (e.g. capability, priority), the cellular UE status (e.g. IDLE, ACTIVE, CONNECTED), mobile/mobility contexts (e.g. location, cellular state and ongoing service), status/measurement report (e.g. detected reference signals/sequences, interference in the neighborhood), available network resources, load level and interference status throughout the D2D registration area considering the individual local cell the UE in question is camping in, and the like. Such information may be acquired by being received from, being measured from, and/or being indicated by respective network entities and/or mobile devices. This enables certain admission control and, therefore, enhances management capability of the network in D2D support.

An initial resource allocation as described above may include, for example, one or more of the following: a reference signal(s) or sequence(s) or beacon(s) containing, e.g., a designated physical identity (L1 ID) which may exemplarily be similar to the L1 cell ID in LTE/LTE-A; transmit power for transmitting the reference signal, sequence or beacons on respective channels; scheduling constraints for further beaconing and channel allocation; and the like. It may, for example, further include structural format, configuration and allocation of actual D2D physical channels for transmitting the reference signal, sequence or beacon, which may be predefined, semi-static and common across the D2D registration area, thus possibly being hardcoded or advertised to the UE in a system broadcast information throughout the D2D registration area. For example, there may be allocated UE-specific orthogonal sequences (e.g. on at least some of subcarriers of a beacon channel), which would allow to detect and identify an interfering UE at a receiver station such eNB1. This could, for example, be advantageously used for triggering sort of interference-resolution procedure by reassigning the beacon channel for at least one of interfering UEs, or the like.

The initial resource allocation being decided and determined/coordinated/updated/reconfigured at the network is then assigned to the UE which has, for example, sent a D2D resource request. A corresponding assignment notification includes respective configurations and constraints of the initial resource allocation. For example, it notifies about the type of initial resource allocation, i.e. whether it concerns an (individual) resource assignment to a specific UE as a beacon channel or the like or a (general) resource allocation to a cell or even the registration area as a common direct access channel for uplink.

The UE which has been assigned with the initial resource allocation may start sending the reference signal, sequence and beaconing. This UE may be referred to as advertising UE. In case D2D resources are momentarily not available upon the D2D registration of the UE, the UE may still be registered but not allocated and configured to send any such reference signal, sequence or beaconing. If so, this UE may be referred to as silence UE. The silence UE may still be able to detect other advertising UEs and initiate a D2D connection setup request with a detected advertising UE.

Figure 3:
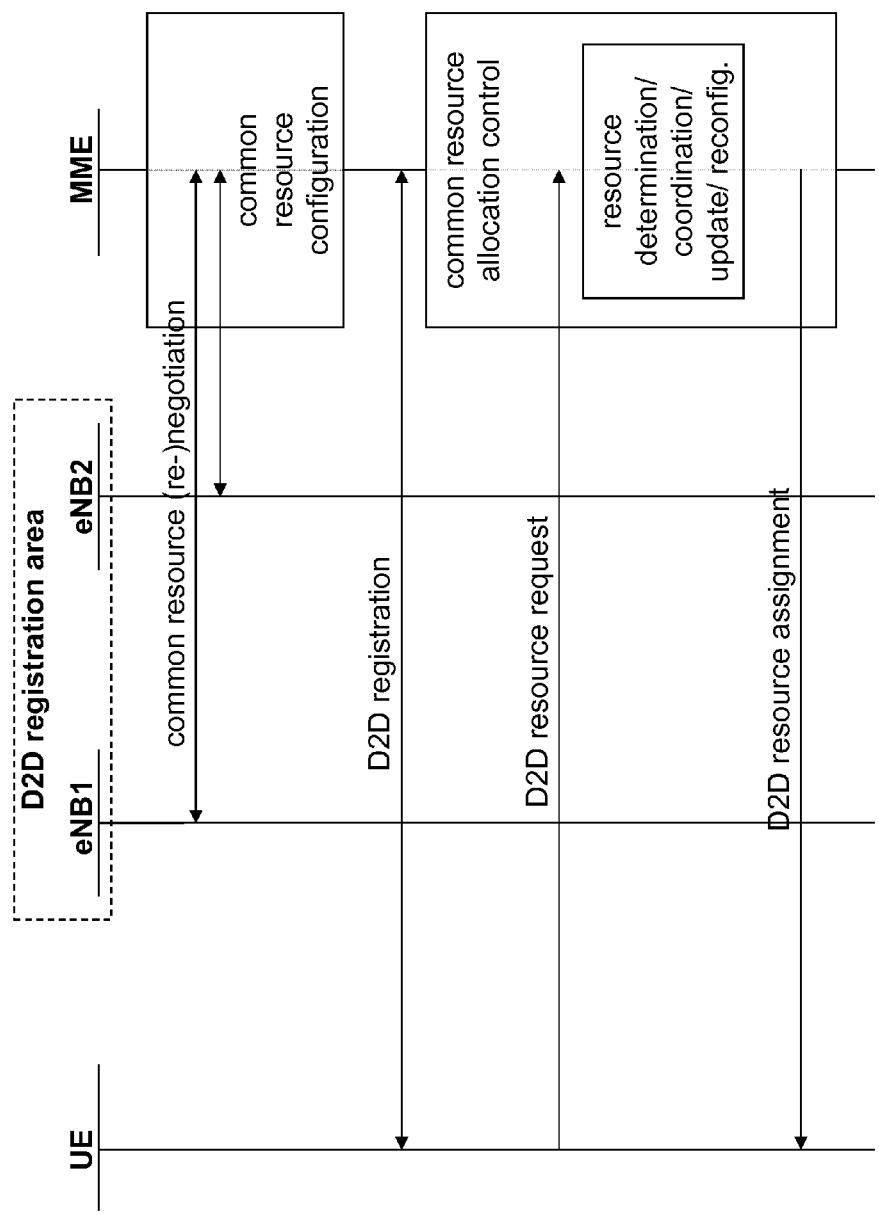
FIG. 3 shows a signaling diagram of a procedure according to exemplary embodiments of the present invention, which is based on the deployment scenario depicted in FIG. 1.

FIG. 3 shows a signaling diagram of a procedure according to exemplary embodiments of the present invention, which is based on the deployment scenario depicted in FIG. 1. In the example of FIG. 3, it is assumed that base stations eNB1 and eNB2 (or the cells thereof) constitute a D2D registration area, and that the DRSF serving this D2D registration area is implemented in a centralized manner in the core network element (i.e. MME) or other network control server serving both base stations across the D2D registration area.

The procedure according to the example of FIG. 3 is essentially similar to that according to the example of FIG. 2, except for the difference in the entity executing common resource configuration and common resource allocation control. Namely, due to the DRSF being assumed to be implemented at the MME representing a non-limiting example for a core network element serving both eNB1 and eNB2 constituting the D2D registration area in question, the basic operations of the procedure are realized at the MME, e.g. by a correspondingly configured processor of the entity hosting the DRSF, in the present example the MME, instead of at one of or both of the eNBs.

This different deployment basically results in a different in resource (re-)negotiation. Namely, as the DRSF is centralized in e.g. MME, the above (re-)negotiation of common D2D resources happens between the MME hosting the DRSF and both eNBs. The individual eNBs may, again, be responsible for radio measurement on the common D2D resources in their respective cells and for reporting the measurement to the DRSF to help making a proper decision on the D2D resource allocation.

Otherwise, reference is made to the description of FIG. 2 for details of the procedure according to the present example.

As described above, embodiments of the present invention provide for mechanisms to enable a reliable and effective network-configured and network-controlled initial resource allocation for D2D devices, applicable e.g. in advanced cellular systems such as 3GPP LTE-A. These mechanisms are based on the concept of a D2D registration area, are effective in the context of enabling D2D communication, including e.g. advertising/beaconing, detection of UE-capable UEs, and/or actual connection/communication setup, and may be applied for both in-band and out-band D2D. The overall channel resources for UEs to transmit individual D2D reference signals or sequences or broadcasting beacon channels are commonly configured and allocated across the D2D registration area, thus enabling that the radio range of a D2D connection/communication may cross multiple cells depending on the cell size and deployment structure.

It is noted that, according to embodiments of the present invention, enabling D2D communication may include advertising/beaconing and detecting potential communication partners (i.e. discovery of D2D-capable UEs within reach) and/or D2D connection/communication setup towards one or more detected D2D-capable UEs. In general terms, according to embodiments of the present invention, enabling D2D communication may also be referred to as D2D connection establishment.

By commonly configuring, allocating and assigning spatially reusable reference signals, sequences and/or beaconing channel resources for initial D2D resource allocation across a designated D2D registration area instead of cell basis, not only a reliable and effective solution to facilitate D2D UE discovery, and, therefore, UE-initiated D2D communications across multiple cells may be provided. But also efficient network configuration and control of D2D user devices may be enabled even in IDLE state of the donor cellular system.

Embodiments of the present invention may be suited for LTE/LTE-A systems with FSU and SON, including carrier aggregation, autonomous carrier selection and cell configuration. In such systems, according to embodiments of the present invention, it may be practical to find exclusive resources reserved for D2D, at least particularly for the initial phases of enabling D2D communication, including e.g. advertising/beaconing, detection of UE-capable UEs, and/or actual connection/communication setup.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 4, while for the sake of brevity reference is made to the detailed description of respective corresponding methods and operations according to FIGS. 2 and 3 on the basis of FIG. 1, respectively.

Figure 4:
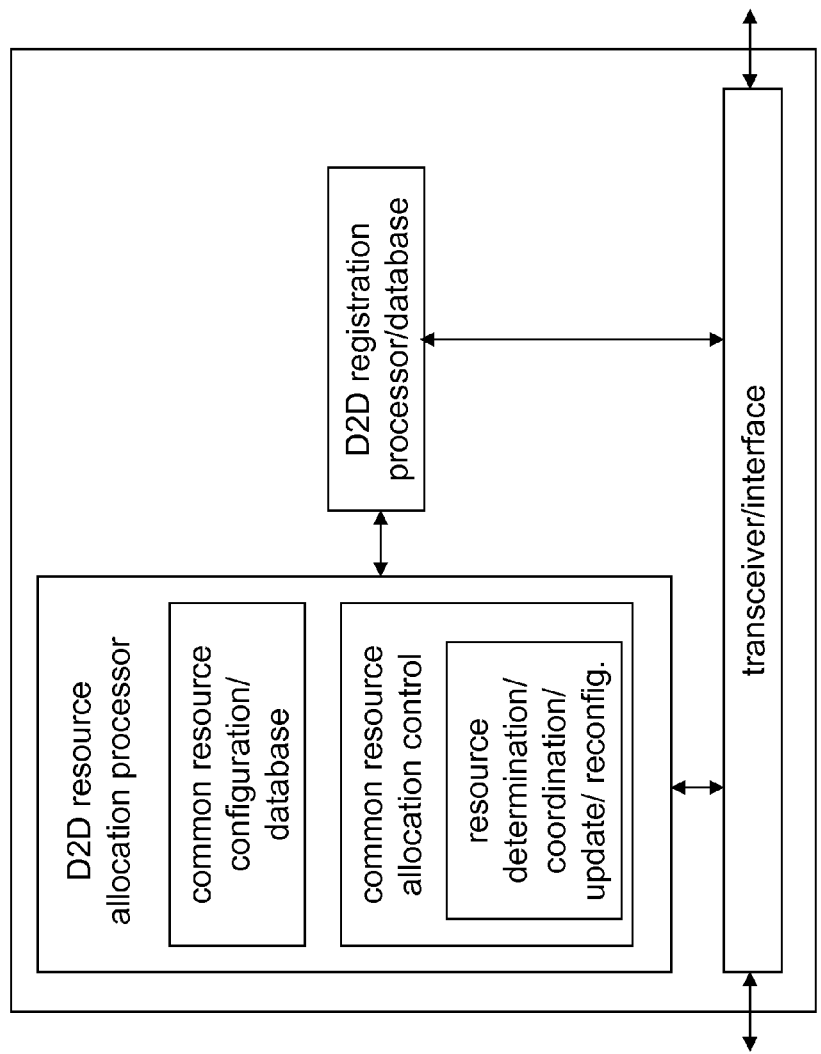
FIG. 4 shows a block diagram of an apparatus according to exemplary embodiments of the present invention.

In FIG. 4 below, the solid line blocks are basically configured to perform respective operations as described above. The entirety of solid line blocks are basically configured to perform the methods and operations as described above, respectively. With respect to FIG. 4, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling therebetween, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 4, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 4 shows a block diagram of an apparatus according to exemplary embodiments of the present invention. In view of the above, the thus described apparatus may represents a (part of a) D2D Registration Server Function (DRSF) which may be implemented by or at a base station such as an eNB and/or a core network element or network control server such as an MME, as described above.

According to FIG. 4, the apparatus according to exemplary embodiments of the present invention is configured to perform a procedure as described in conjunction with FIG. 2 or 3. Therefore, while basic operations are described hereinafter, reference is made to the above description for details.

According to an exemplary embodiment depicted in FIG. 4, the thus depicted apparatus comprises a processor being exemplarily denoted as D2D resource allocation processor. The D2D resource allocation processor may be specifically configured to configure common (D2D) resources for supporting direct communication between terminals across a predefined (D2D) registration area comprising one or more cells of a cellular system, thus representing means for common resource configuration. Also, the D2D resource allocation processor may be specifically configured to control an allocation of common (D2D) resources for enabling direct (D2D) communication between terminals across the predefined (D2D) registration area, thus representing means for common resource allocation control.

According to exemplary embodiments of the present invention, the D2D resource allocation processor may also be specifically configured to negotiate the common (D2D) resources with one or more base stations of cells comprised in the predefined (D2D) registration area, and/or to renegotiate the common (D2D) resources upon reconfiguration of the predefined (D2D) registration area, thus representing means for common resource (re-)negotiation. Further, the D2D resource allocation processor may also be specifically configured determine and assign the allocation of common (D2D) resources and the configuration thereof to a terminal such as UE being registered to the predefined (D2D) registration area, and/or to determine and assign the allocation of common (D2D) resources as a common direct access channel to a cell comprised in the predefined (D2D) registration area or the predefined (D2D) registration area, thus representing means for common resource allocation determination and assignment. Still further, the D2D resource allocation processor may also be specifically configured to coordinate the allocation of common (D2D) resources for enabling spatial reuse thereof, thus representing means for resource reuse coordination. Even still further, the D2D resource allocation processor may also be specifically configured to update and/or reconfigure the allocation of common (D2D) resources upon request by one or more terminals and/or system-based initiation, thus representing means for common resource update and/or reconfiguration.

According to an exemplary embodiment depicted in FIG. 4, the thus depicted apparatus may comprises further means for supporting the D2D resource allocation processor in executing the above-explained procedures and operations. While such supporting means specifically configured to correspondingly interact with the D2D resource allocation processor may be implemented in any way (including e.g. integrated with the D2D resource allocation processor or external to the illustrated apparatus), they may exemplarily be regarded as a D2D registration processor/database and/or a transceiver/interface, as exemplarily illustrated in FIG. 4. The transceiver/interface may be specifically configured to accomplish any interaction with external entities, i.e. UE and eNB2 in case of the example of FIG. 2, or UE, eNB1 and eNB2 in case of the example of FIG. 3, thus e.g. realizing the any message or information exchange outside the illustrated apparatus. The D2D registration processor/database may be specifically configured to accomplish any auxiliary measures regarding the establishment, management, storage, etc. of user/device registration in the respective D2D registration area.

While not being illustrated, exemplary embodiments of the present invention also encompass an apparatus being operated as or at a mobile device or UE. Such apparatus may by configured to perform any UE-side procedure as described above and/or as required for supplementing the network-side procedures as described in conjunction with FIG. 2 or 3. Therefore, reference is made to the above description for details. For example, such an apparatus at the UE-side may be specifically configured to realize any message or information exchange (e.g. by way of a correspondingly configured transceiver/interface), to use an assigned initial resource allocation for enabling D2D communication, including e.g. advertising/beaconing, detection of UE-capable UEs (UE discovery), actual connection/communication setup, and/or initiating resource update/reconfiguration (e.g. by way of a correspondingly configured processor which may exemplarily be denoted as D2D resource processor).

According to exemplarily embodiments of the present invention, a system may comprise any conceivable combination of the thus depicted apparatus (such as eNB1 or MME) and other network elements (such as other base stations, mobile devices, or the like), which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefore), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for resource allocation for direct terminal-to-terminal communication in a cellular system, said measures exemplarily comprising configuration of common resources for supporting direct communication between terminals across a predefined registration area comprising one or more cells of a cellular system, and control of an allocation of common resources for enabling direct communication between terminals across the predefined registration area. Said measures may exemplarily be applied for establishing terminal-to-terminal communication in LTE or LTE-Advanced cellular networks.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising:

configuring common resources for supporting direct communication between terminals across a predefined registration area for direct communication comprising one or more cells of a cellular system of an evolved UNITS terrestrial radio access network, and controlling an allocation of common resources for enabling direct communication between terminals across the predefined registration area, said controlling comprising:

determining and assigning the allocation of common resources and the configuration thereof to a terminal being registered to the predefined registration area with a temporary identifier allocated by the cellular system identifying the terminal at least in cellular idle state to the cellular system, and wherein said enabling comprises at least one of:

using the assigned resources for advertising the presence of the terminal for direct communication to terminals in the registration area, and using the assigned resources for detecting the terminal as communication partner for direct communication by terminals in the registration area.

2. The method according to claim 1, said configuring comprising at least one of:

negotiating the common resources with one or more base stations of cells comprised in the predefined registration area, and renegotiating the common resources upon reconfiguration of the predefined registration area by activation or deactivation of one or more base stations of cells comprised in the predefined registration area.

3. The method according to claim 1, said controlling comprising:

determining and assigning the allocation of common resources as a common direct access channel to a cell comprised in the predefined registration area or the predefined registration area.

4. The method according to claim 1, said controlling comprising:

coordinating the allocation of common resources for enabling spatial reuse of common resources within the predefined registration area and/or between the predefined registration area and one or more overlapping and/or neighboring registration areas.

5. The method according to claim 1, said controlling comprising:

updating and/or reconfiguring the allocation of common resources upon request by one or more terminals and/or system-based initiation.

6. The method according to claim 1, the allocation of common resource comprising one or more of:

one or more reference signals, reference sequences, and/or beacons, one or more physical channels for transmitting reference signals, reference sequences, and/or beacons, transmit power for transmitting reference signals, reference sequences, and/or beacons, and schedule for transmitting reference signals, reference sequences, and/or beacons.

7. The method according to claim 1, the allocation of common resource being based on one or more of:

terminal profile characteristics and/or status of one or more terminals, mobility contexts of one or more terminals and/or one or more cells, characteristics and/or load level of common resources, and availability of resources and/or interference status in the predefined registration area.

8. A computer program product comprising a non-transitory computer-readable storage medium bearing computer program code embodied therein for use with a computer, the computer program code comprising code for performing the method according to claim 1.

9. The method according to claim 1, wherein the method is operable at or by a dedicated registration server function for managing the predefined registration area which is operable as or at one or more base stations of cells comprised in the predefined registration area or a network.

10. The method according to claim 1, wherein said enabling further comprises using the assigned resources for setting up a connection for direct communication between the terminal and a second terminal.

11. The method according to claim 1, further comprising updating the registration of a terminal in cellular active state being registered to the registration area in a handover procedure.

12. An apparatus comprising:
- at least one processor; and
- at least one memory including computer program code, the at least one memory and the computer program code configured, with the at least one processor, to cause the apparatus to perform the following:
- configure common resources for supporting direct communication between terminals across a predefined registration area for direct communication comprising one or more cells of a cellular system of an evolved UMTS terrestrial radio access network, and
- control an allocation of common resources for enabling direct communication between terminals across the predefined registration area, said controlling comprising:
- determining and assigning the allocation of common resources and the configuration thereof to a terminal being registered to the predefined registration area with a temporary identifier allocated by the cellular system identifying the terminal at least in cellular idle state to the cellular system, and
- wherein said enabling comprises at least one of:
- using the assigned resources for advertising the presence of the terminal for direct communication to terminals in the registration area, and
- using the assigned resources for detecting the terminal as communication partner for direct communication by terminals in the registration area.

13. The apparatus according to claim 12, wherein said at least one memory and the computer program code are further configured, with the at least one processor, to cause the apparatus to perform at least one of the following:
- negotiate the common resources with one or more base stations of cells comprised in the predefined registration area, and
- renegotiate the common resources upon reconfiguration of the predefined registration area by activation or deactivation of one or more base stations of cells comprised in the predefined registration area.

14. The apparatus according to claim 12, wherein said at least one memory and the computer program code are further configured, with the at least one processor, to cause the apparatus to perform:
- determine and assign the allocation of common resources as a common direct access channel to a cell comprised in the predefined registration area or the predefined registration area.

15. The apparatus according to claim 12, wherein said at least one memory and the computer program code are further configured, with the at least one processor, to cause the apparatus to perform:
- coordinate the allocation of common resources for enabling spatial reuse of common resources within the predefined registration area and/or between the predefined registration area and one or more overlapping and/or neighboring registration areas.

16. The apparatus according to claim 12, wherein said at least one memory and the computer program code are further configured, with the at least one processor, to cause the apparatus to perform:
- update and/or reconfigure the allocation of common resources upon request by one or more terminals and/or system-based initiation.

17. The apparatus according to claim 12, wherein said at least one memory and the computer program code are further configured, with the at least one processor, to cause the apparatus to perform:
- control the allocation of common resource comprising one or more of:
  - one or more reference signals, reference sequences, and/or beacons,
  - one or more physical channels for transmitting reference signals, reference sequences, and/or beacons,
  - transmit power for transmitting reference signals, reference sequences, and/or beacons, and
  - schedule for transmitting reference signals, reference sequences, and/or beacons.

18. The apparatus according to claim 12, wherein said at least one memory and the computer program code are further configured, with the at least one processor, to cause the apparatus to perform:
- control the allocation of common resource based on one or more of
  - terminal profile characteristics and/or status of one or more terminals,
  - mobility contexts of one or more terminals and/or one or more cells,
  - characteristics and/or load level of common resources, and
  - availability of resources and/or interference status in the predefined registration area.

19. The apparatus according to claim 12, wherein the apparatus is operable as or at a dedicated registration server function for managing the predefined registration area which is operable as or at one or more base stations of cells comprised in the predefined registration area or a network element controlling one or more base stations of cells comprised in the predefined registration area.

20. The apparatus according to claim 12, wherein said enabling further comprises using the assigned resources for setting up a connection for direct communication between the terminal and a second terminal.

21. The apparatus according to claim 12, wherein said at least one memory and the computer program code are further configured, with the at least one processor, to cause the apparatus to update the registration of a terminal in cellular active state being registered to the registration area in a handover procedure.

22. A method comprising:
- registering a terminal for direct communication between terminals to a predefined registration area comprising one or more cells of a cellular system of an evolved UMTS terrestrial radio access network with a temporary identifier allocated by the cellular system identifying the terminal at least in cellular idle state to the cellular system,
- receiving by the terminal an assignment indication of resources for enabling direct communication in the registration area,
- wherein said enabling comprises at least one of:
- using the assigned resources for advertising the presence of the terminal for direct communication to terminals in the registration area, and
- using the assigned resources for detecting the terminal as communication partner for direct communication by terminals in the registration area.

23. The method according to claim 22 further comprising receiving a paging message for setup of a direct communication connection.

24. The method according to claim 22 further comprising one or more of:
- requesting an assignment of resources for enabling direct communication in the registration area,
- requesting an update of assigned resources for enabling direct communication in the registration, and
- requesting reconfiguration of resources for enabling direct communication in the registration area.

25. A computer program product comprising a non-transitory computer-readable storage medium bearing computer program code embodied therein for use with a computer, the computer program code comprising code for performing the method according to claim 22.

26. An apparatus comprising:
- at least one processor; and
- at least one memory including computer program code, the at least one memory and the computer program code configured, with the at least one processor, to cause the apparatus to perform the following:
- register for direct communication between terminals to a predefined registration area comprising one or more cells of a cellular system of an evolved UNITS terrestrial radio access network with a temporary identifier allocated by the cellular system identifying the apparatus at least in cellular idle state to the cellular system,
- receive an assignment indication of resources for enabling direct communication in the registration area,
- wherein said enabling comprises at least one of:
  - using the assigned resources for advertising the presence of the apparatus for direct communication to terminals in the registration area, and
  - using the assigned resources for detecting the apparatus as communication partner for direct communication by terminals in the registration area.

27. The apparatus according to claim 26 wherein said at least one memory and the computer program code are further configured, with the at least one processor, to cause the apparatus to receive a paging message for setup of a direct communication connection.

28. The apparatus according to claim 26 wherein said at least one memory and the computer program code are further configured, with the at least one processor, to cause the apparatus to perform one or more of:
- request an assignment of resources for enabling direct communication in the registration area,
- request an update of assigned resources for enabling direct communication in the registration, and
- request reconfiguration of resources for enabling direct communication in the registration area.

* * * * *

UNITED STATES PATENT AND TRADEMARK OFFICE
CERTIFICATE OF CORRECTION

PATENT NO. : 9,198,162 B2
APPLICATION NO. : 13/636378
DATED : November 24, 2015
INVENTOR(S) : Van Phan et al.

It is certified that error appears in the above-identified patent and that said Letters Patent is hereby corrected as shown below:

In the claims

Claim 1, col. 15, line 55 "UNITS" should be deleted and --UMTS-- should be inserted.

Claim 26, col. 19, line 22 "UNITS" should be deleted and --UMTS-- should be inserted.

Signed and Sealed this
Twelfth Day of April, 2016

Michelle K. Lee
*Director of the United States Patent and Trademark Office*